United States Patent
Davis

[15] 3,662,545
[45] May 16, 1972

[54] ACCELERATION CONTROL CIRCUIT FOR A GAS TURBINE

[72] Inventor: Richard K. Davis, Roanoke, Va.
[73] Assignee: General Electric Company
[22] Filed: Aug. 24, 1970
[21] Appl. No.: 66,268

[52] U.S. Cl. ........................... 60/39.28, 60/39.14
[51] Int. Cl. .................................. F02c 9/08
[58] Field of Search ............................. 60/39.28

[56] References Cited

UNITED STATES PATENTS

| | | | |
|---|---|---|---|
| 3,295,316 | 1/1967 | Beatrice | 60/39.28 |
| 3,181,353 | 5/1965 | Brahm | 60/39.28 X |
| 3,288,160 | 11/1966 | Eggenberger | 415/17 X |
| 3,520,133 | 7/1970 | Loft | 60/39.28 X |

Primary Examiner—Clarence R. Gordon
Attorney—Arnold E. Renner, James C. Davis, Frank L. Neuhauser, Oscar B. Waddell and Joseph B. Forman

[57] ABSTRACT

An electrical control circuit for adjusting the fuel input to rotating machinery such as a gas turbine during acceleration, includes a positive speed feedback signal in opposition to a reference signal representing maximum allowable acceleration. A third input signal, applied to the input of the control circuit in equal opposition to the speed reference signal when the acceleration of the turbine is zero, prevents a time delay from occurring in control reaction to changes in speed of the turbine.

8 Claims, 3 Drawing Figures

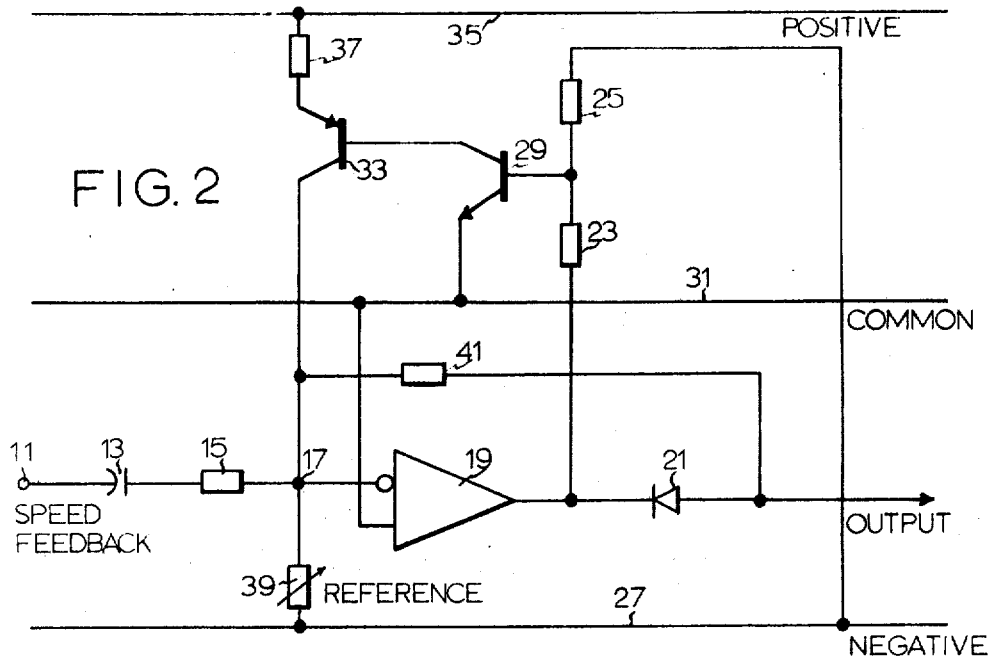
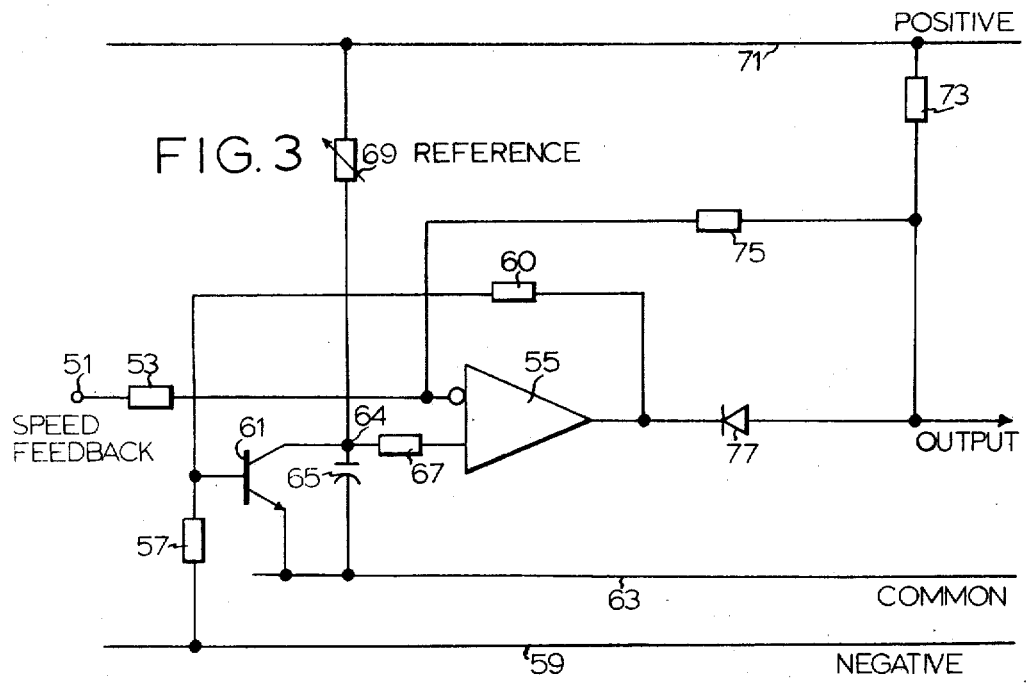

ACCELERATION CONTROL CIRCUIT FOR A GAS TURBINE

BACKGROUND OF THE INVENTION

The major function of a control system for rotating machinery such as a gas turbine is to prevent damage to the machinery due to thermal shock of the hot gas exposed parts or other mechanical shock due to extreme speed changes. Such a control, therefore, performs at least the following three functions: (1) temperature control whereby excessive rise of temperature during starting or speed increases of the machinery are limited through control of the input of fuel thereto; (2) speed control which provides regulation of the fuel to the machinery under operating conditions and in response to the changing load requirements; and, (3) the start-up control which provides protection to the machinery during the initial operation of starting thereof and through the various steps between standstill and operating speed. A fourth control function provides acceleration limiting means in order to prevent excessive changes in inertia due to large speed changes of the machinery and to prevent overshoot of operating speed due to loss in load.

In the past, attempts have been made in turbine control systems to prevent excessive temperature changes during the start-up cycle of the turbine. This resulted in control systems which contain mechanical, hydraulic, and electrical equipment in various combinations. However, temperature changes and speed changes during the start-up cycle are the result of very complicated combinations of influences. For example, speed of the turbine increases with increased efficiency resulting from higher temperatures. Since the fuel pump is driven from the turbine shaft, higher speed of the turbine results in an increase of fuel supply. Increased fuel supply causes an increase in speed and temperature. To control all these variables, a system evolved which provides for a cranking period during which fuel to the turbine is withheld until a starter motor has brought the turbine up to a predetermined speed. Upon attaining this predetermined speed, fuel is applied and fired. When flames are detected, sensors provided therefor in the turbine produce an electrical signal which initiates a warm-up cycle. This cycle is followed by an acceleration period during which fuel supply to the turbine is increased at a predetermined rate. Since efficiency improves with speed of the turbine and fuel supply is necessarily a function of speed due to the mechanical cooperation of the fuel pump and the turbine shaft, large amounts of fuel are supplied to the turbine as it approaches operating speed. The rate at which the fuel is increased may produce considerable thermal shock to the hot gas exposed parts of the turbine and may thereby jeopardize the operating life of the machine unnecessarily.

In addition, there exists the danger that, due to sudden loss in loading of the turbine, the turbine will transcend the maximum allowable speed. The acceleration function must be able to step in and accept instant responsibility for adjusting the fuel input to the turbine to a value thereby allowing the speed of the turbine to increase at a safe rate. In some controls developed in the past, a lag time exists as a result of the inability of the acceleration function to act immediately in response to a feedback signal representing excessive acceleration. As a result of this lag time, the turbine accelerates out of control until such time when the acceleration function gains control of the fuel input to the turbine.

SUMMARY OF THE INVENTION

In order to overcome the existing control systems problems, the present invention provides a means for rapidly adjusting the fuel input to a gas turbine during periods of excessive acceleration.

The acceleration control function provides a protective means which operates any time an excessive increase in speed tends to occur, as, for example, when the turbine is running at operating speed and a sudden loss of loading of the turbine occurs. The turbine, having fuel applied thereto at a level suited to the load, will rapidly accelerate beyond the desired speed conditions should loading be suddenly reduced. The acceleration control function of the present invention senses the increase in speed through a feedback signal and takes over control of turbine fuel input. As a result thereof, the fuel input to the turbine is cut back which causes the turbine to decrease its rate of acceleration under controlled conditions. This fuel reduction is accomplished in accordance with the present invention by circuitry wherein an adjustable speed reference signal is balanced against an acceleration feedback signal which varies during changes in speed of the turbine. When the operating speed of the turbine is reached, i.e., when acceleration is zero, current of the acceleration feedback signal is zero, which results in an unbalance condition at the input of the fuel adjusting control. A switching circuit, sensing this unbalance, provides a third signal which is applied to the input of the fuel control in opposition to the speed reference signal in order to temporarily replace the feedback signal, hence, restore the balance of the input to the fuel control applied thereto.

BRIEF DESCRIPTION OF THE DRAWINGS

FIG. 2 illustrates a gas turbine acceleration control circuit of a first embodiment of the present invention.

FIG. 3 illustrates a gas turbine acceleration control circuit of a second embodiment of the present invention.

DETAILED DESCRIPTION

Figure 1:
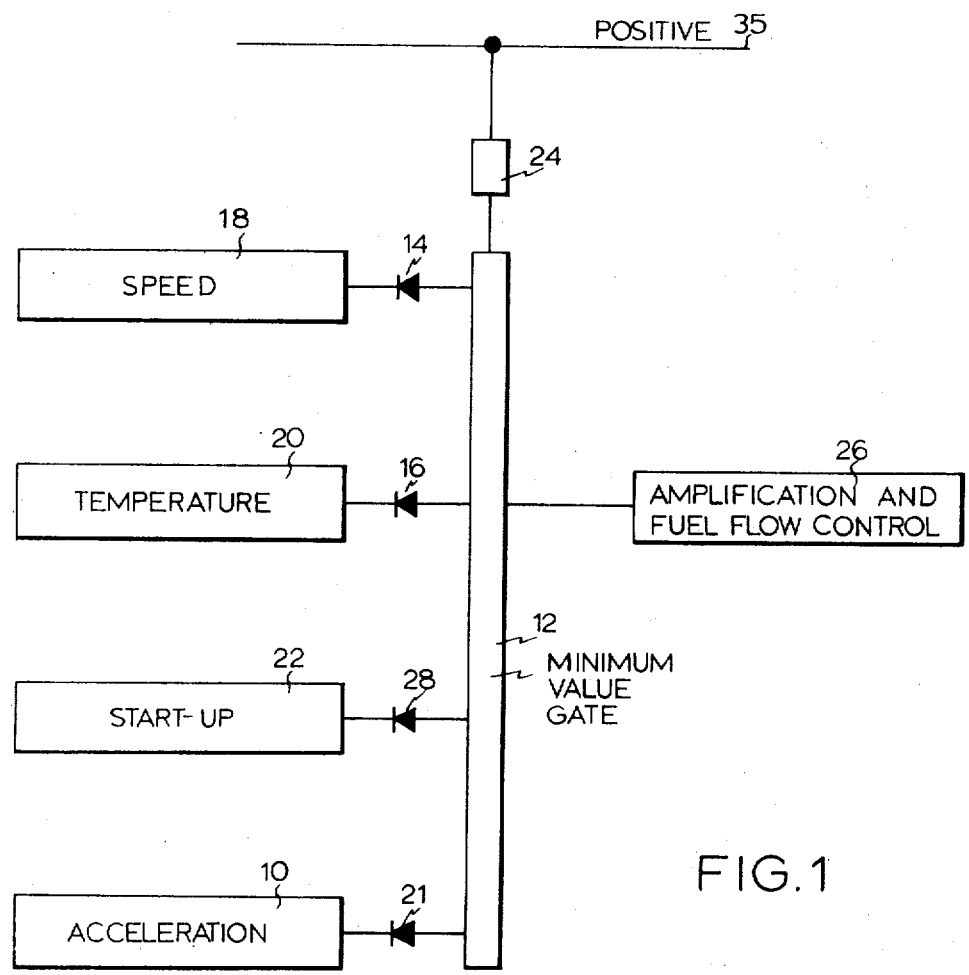
FIG. 1 illustrates the relationship of various functions of gas turbine control system.

Refer now to FIG. 1. A minimum value gate 12 is shown connected to the anodes of four diodes 14, 16, 28 and 21 which respectively connect to the four main controls 10, 18, 20 and 22 (illustrated in block form) of a gas turbine. The speed control 18 adjusts the fuel flow applied to the turbine (not shown) during normal load and running conditions and maintains speed of the turbine constant. The temperature control, 20, adjusts fuel flow to the turbine in order to maintain temperature of the turbine hot gas parts within allowable limits.

The start-up control, 22, supervises the turbine conditions from initial starting, through the warm-up period, and the initial acceleration period until operating speed has been achieved. The start-up control is programmed to control a starter motor (not shown) which cranks the turbine from standstill to a predetermined speed while fuel flow to the turbine is being withheld. When the predetermined speed is reached, fuel is applied and fired. As soon as flame is detected, fuel flow is reduced to a minimum level in order to reduce temperature changes to maximum allowable values. Subsequent to a short period of reduced fuel flow, fuel flow is increased at a predetermined rate until operating speed has been reached.

A fourth control closely associated to the start-up procedure of the turbine is the acceleration control (10) which provides protective service to the turbine during speed changes by assuming supervision over the turbine whenever excessive speed increases occur. The minimum value gate 12, schematically represented in block form, provides for automatic selection of the control which will provide the control function of the turbine. Current flows from a positive bus 35 through resistor 24 into the minimum value gate 12 in order to maintain the positive output voltage therefrom at a predetermined level. The output voltage level determines the amount of fuel which will be applied to the turbine by the amplification and fuel flow control 26 schematically represented in block form.

That portion of the control which has the lowest voltage level assumes control over the turbine. For example, if temperature rise exceeds a predetermined value, a voltage level reduction of the output of the temperature control 20 will result. Current therefore is diverted from the amplification and fuel flow control 26 through diode 16 into the temperature control 20. With a lower output, resulting from this diversion of current, the amplification and fuel flow control 26 adjusts the fuel input to the turbine proportionally.

Similarly, when excessive acceleration occurs, the acceleration control 10 provides adjustment of the fuel input of the turbine. The voltage level of the acceleration control 10 reduces with an increase in acceleration of the turbine. This reduction in voltage level causes current to be diverted to the acceleration control 10 from the amplification and fuel flow control 26. With reduction of output resulting from this diversion of current, the amplification and fuel flow control 26 reduces fuel input to the turbine proportionally.

Reference is now made to FIG. 2 which shows the circuitry of a gas turbine acceleration control 10 using differentiation of the speed feedback signal as an input signal.

A speed feedback signal representing the instantaneous speed of turbine is normally produced by tachometer (not shown) which is attached to the shaft of the turbine and is applied to circuitry of the acceleration control 10 through input terminal 11. The signal path includes the series connections of a capacitor 13, resistor 15, summing junction 17, and the inverse input of an operational amplifier 19. The output signal of operational amplifier 19 is applied to the cathode of a diode 21 and through series connected resistors 23 and 25 to negative bus 27. The junction of the resistors 23 and 25 is connected to the base of a transistor 29 which has its emitter connected to a common bus 31 and its collector connected to the base of a transistor 33. Transistor 33 has its emitter connected to a resistor 37 and its collector is connected to resistor 41 and summing junction 17. Resistor 37 receives current from positive bus 35. The anode of diode 21 forms the output of the acceleration control 10 and is further connected to a resistor 41.

A variable resistor 39 forms a reference signal by allowing a predetermined quantity of current to pass from the negative bus 27 to the summing junction 17. The normal input of operational amplifier 19 is connected to common bus 31.

The capabilities of an operational amplifier such as shown in the drawings is well-known to those skilled in the art and is described in many books. One such book is the Systems Engineering Handbook by Machol, McGraw-Hill Publishers, Library of Congress Catalog No. 64-19214, wherein the operation of this type of amplifier is described on pages 10-4 through 10-7. In general, an operational amplifier is a high gain amplifier having an input connection of which the input voltage tends to be substantially equal to zero.

For simplicity of explanation, assume now that summing junction 17 receives only three signals: (1) the positive speed feedback signal through capacitor 13 and resistor 15; (2) the negative speed reference signal through resistor 39; and (3) a positive signal which determines the gain of the amplifier 19 and is derived from the anode of diode 21, through resistor 41.

Since the input signal to the operational amplifier 19 approaches zero, the algebraic sum of the three above-named signals tends to be zero. Hence, the reference signal is equal to the sum of the speed feedback signal and the gain feedback signal when the turbine speed is equal to the speed set by the reference resistor 39. At standstill, no speed feedback signal is produced, thus the input to the operational amplifier 19 exists solely of the negative reference signal through resistor 39. The operational amplifier under the influence of such a negative input signal produces an output signal having a very high extremely positive value. This is normally termed "the amplifier is in positive saturation," since the output has reached its maximum positive value. Operational amplifier 19 is therefore in positive saturation at the start of operation, as a result of its negative input signal.

In operation, capacitor 13 is initially discharged so that the speed feedback signal applied to the acceleration circuit 10 through terminal 11 causes a large positive current to flow into summing junction 17 where it is opposed by a preset negative current from the reference signal through resistor 39. This combination of signals results in a positive input signal to operational amplifier 19.

An operational amplifier would normally produce a negative output signal under these conditions; however, operational amplifier 19 is biased to produce only positive output signals. Therefore, operational amplifier 19 now produces a positive signal of lower magnitude than the voltage level of the minimum value gate in FIG. 1. Current, therefore, flows into the acceleration circuit 10 rather than the amplification and fuel flow control circuit, resulting in a reduction in fuel applied to the turbine. As capacitor 13 charges, current through resistor 15 to the summing junction 17 reduces correspondingly and eventually diminishes to zero when capacitor 13 is fully charged.

Capacitor 13 is fully charged when the voltage level of the speed feedback signal is equal to the voltage level of the speed reference signal, ignoring the gain feedback signal through resistor 41. Since the current through resistor 15 to the summing junction is zero, the voltage from the feedback source is zero, which causes the input to the operational amplifier 19 to consist primarily of the negative reference signal. The negative input causes operational amplifier 19 to go into positive saturation.

Should the turbine suddenly increase speed, such as occurs when load to the turbine is reduced, the speed feedback signal will increase, charging capacitor 13 to a new level. In the prior art, the summing junction is negative at this point, resulting in a delay period before the operational amplifier can recover from its positive saturation and produce a positive signal of lower magnitude which will cause the acceleration control to accept responsibility over the fuel input to the turbine. During this delay interval, acceleration may have exceeded the safe limits of the turbine.

However, the present invention as illustrated in FIGS. 2 and 3 provides a control whereby this delay interval is avoided by opposing the negative reference signal by a temporary equal positive balancing signal. For this purpose, as shown in FIG. 2, the positive output signal produced by the operational amplifier 19 when in saturation condition is applied to a voltage dividing bridge formed by resistors 23 and 25. The resultant positive signal is applied to the base of transistor 29 which is thereby caused to conduct current from the base of transistor 33 through transistor 29 to common bus 31. The current flowing from its base places transistor 33 in a conducting state, causing current to flow from the positive bus 35 through resistor 37 and transistor 33 to the summing junction 17. This current provides a positive voltage input level to summing junction 17 in opposition to an equal but negative voltage input level from the speed reference signal, whereby a substantially zero input signal is applied to the operational amplifier 19. The output of the operational amplifier is, as a result thereof, slightly positive and places the operational amplifier in a substantially "ready to go" state. If now, a sudden increase in speed causes the speed feedback signal applied to input 11 to produce, through capacitor 13, a positive potential to the input of operational amplifier 19, the amplifier will instantly produce a reduced positive potential output signal causing the acceleration control 10 to accept responsibility of fuel control to the turbine. The less positive output signal causes transistor 29 to turn off, whereby conduction of transistor 33 is terminated. This removes the positive input signal through resistor 37 to summing junction 17. Hence, fuel control to the turbine is now dependent solely upon the input signal to the operational amplifier resulting from combination of the speed feedback signal and speed reference signal.

A second embodiment of the present invention is shown in FIG. 3. A speed feedback signal is applied to input 51 and conducted through a resistor 53 to an inverted input of an operational amplifier 55. A resistor 57 is connected to negative bus 59 on one side, and on the other side to a resistor 60 and to the base of transistor 61. Resistor 60 receives an output signal of operational amplifier 55. The emitter of transistor 61 is connected to a common bus 63 while the collector of transistor 61 carries current from a summing junction 64, which also connects to one side of a capacitor 65. Resistor 67 carries current from the normal input of the operational amplifier 55 to summing junction 64. Resistor 69 is connected between a positive bus 71 and summing junction 64. Current flows from positive bus 71 through resistor 73 and through feedback resistor 75 to the inverse input connection of operational amplifier 55. The junction between resistor 73 and feedback resistor 75 connects to the anode of diode 77 which represents the output of the acceleration control circuit 81. The cathode of diode 77 receives the output of operational amplifier 55. The output of the acceleration control 81 is applied to a minimum value gate 12 (FIG. 1) in identical manner as was previously described for FIG. 1, with regard to acceleration circuit 10.

In operation, the speed feedback signal, applied to input 51, having a positive polarity is conducted through resistor 53 to the inverting input connection of the operational amplifier 55. A speed reference signal derived from positive bus 71 is applied through resistor 69 to capacitor 65 to charge this capacitor at a predetermined rate set by resistor 69. To achieve linearity in the charging rate of capacitor 65, a constant current source may be used as an alternative supply to the capacitor. The positive speed feedback signal tends to make the output of operational amplifier 55 negative while the positive charge of capacitor 65 which is applied through resistor 67 to the normal input of operational amplifier 55 tends to make the output of operational amplifier 55 positive. Thus, when the instantaneous value of the positive feedback signal is greater than the instantaneous positive charge of the capacitor 65, the operational amplifier produces a reduced positive output signal with respect to the voltage of the minimum value gate 12 (FIG. 1), which gives the acceleration circuit 81 control over the operation of the gas turbine. Conversely, when the positive charge on the capacitor is greater than the instantaneous value of the speed feedback signal, the operational amplifier produces a positive output signal which has a value greater than the voltage of the minimum value gate 12 (FIG. 1) which causes control of the turbine to be accepted by one of the other functions such as speed or temperature. When the voltage level of the charged capacitor becomes greater than the instantaneous positive value of the speed feedback signal 51, the positive output signal of operational amplifier 55 is applied through resistor 60 to the base of transistor 61 in opposition to the negative reference signal through resistor 57. This positive signal tends to place transistor 61 into a conducting state which causes the positive current from the positive bus 71 through resistor 69 to be diverted from the capacitor 65 through transistor 61 to common bus 63, thereby limiting the positive voltage level applied to the normal input of operational amplifier 55. This tends to regulate the output of the operational amplifier 55 to a fixed value when the turbine does not exceed the allowable acceleration. This then produces a balanced condition between the instantaneous value of voltage charge on the capacitor 65 and the instantaneous value of the speed feedback signal at input connection 51, allowing the acceleration control to be effective immediately when an excessive acceleration of the turbine is encountered. Since the speed feedback signal increases at a rate proportional to the acceleration of the turbine and the positive charge of the capacitor increases at a predetermined rate, any time the rate of increase of speed feedback signal is greater than the charging rate of capacitor 65, the output of operational amplifier 55 will tend to go to a lower positive value, which will cause current in the minimum value gate 12 (FIG. 1) to be diverted from the amplification and fuel flow control 26. This causes fuel input to the turbine to be decreased, thereby regulating the acceleration of the turbine.

The present invention thus produces an acceleration control for a gas turbine which will accept instant control over fuel input to the turbine any time acceleration of the turbine is greater than the predetermined charging rate of the capacitor.

What is claimed is:

1. A circuit for limiting acceleration of rotating machinery by regulation of the fuel input, said circuit having applied thereto a feedback signal of one polarity proportional to the instantaneous speed of the machinery being controlled, and a reference signal proportional to the desired speed of the machinery, having a polarity opposing that of the speed feedback signal, said circuit comprising:
   a. an amplifier;
   b. connecting means including a capacitor in circuit with one of said feedback signal and said reference signal for supplying inputs to said amplifier whereby the total input current to said amplifier is proportional to the difference between the actual acceleration and the allowable acceleration; and
   c. switching means connected to said amplifier for applying a signal to the input of said amplifier in opposition to the reference signal when the output of said amplifier is greater than said predetermined value whereby the combined value of the speed reference signal and the speed feedback signal, and the signal derived from said switching means is zero.

2. A circuit for limiting acceleration of rotating machinery by regulation of fuel input, said circuit having applied thereto a feedback signal of one polarity proportional to the speed of the machine being controlled, and a reference signal proportional to the desired speed of the machine having a polarity opposing that of the speed feedback signal, said circuit comprising:
   a. means for differentiating the speed feedback signal;
   b. means for algebraically summing said differentiated feedback signal and the speed reference signal;
   c. means connected to said summing means for producing an output signal having a magnitude proportional to the sum of said differentiated feedback signal and said reference signal;
   d. switching means connected to said output signal for applying an opposing signal to said summing means equal to said reference signal when said output signal has reached a predetermined magnitude whereby the sum of said differentiated feedback signal, said speed reference signal and said opposing signal is equal to zero; and
   e. means connected to said output signal producing means for regulating fuel input to said rotating machine in proportion to said output signal, when said output signal has a value greater than said predetermined magnitude.

3. The invention claimed in claim 2 wherein the differentiating means comprises a capacitor and resistor circuit.

4. The invention claimed in claim 2 wherein the output signal means comprises an operational amplifier.

5. A circuit for limiting acceleration of rotating machinery by regulating fuel input, said circuit having applied thereto a feedback signal proportional to the speed of the machinery being controlled, and a reference signal proportional to the desired speed of the machinery:
   a. a reference signal source;
   b. a capacitor connected to said reference signal source for storing a quantity of electrical energy to achieve a predetermined voltage level;
   c. means connected to said capacitor, said means having input connections adapted to receive the speed feedback signal, a signal proportional to said stored energy at said predetermined voltage level, said means producing an output signal in response to the application of said stored energy signal and said feedback signal;
   d. switching means connected to said output signal producing means and said capacitor, responsive to a predetermined level of said output signal, for diverting the stored energy signal from said capacitor when said output signal exceeds said predetermined levels whereby the combined value of the stored energy signal and the speed feedback signal is equal to zero; and
   e. a means connected to said output signal means for regulating fuel input to the rotating machinery in proportion to said varying output signal when said output signal has a value which is greater than said predetermined level.

6. The invention claimed in claim 5 wherein said output producing means comprises an operational amplifier having a normal input connection and an inverse input connection.

7. The invention claimed in claim 6 wherein said switching means is a transistor connected to said capacitor and said normal input connection of said operational amplifier.

8. The invention claimed in claim 6 wherein said speed feedback signal is applied to said inverse connection of said operational amplifier.

* * * * *